No. 608,144. Patented July 26, 1898.
D. R. PORTER.
EGG BROILER.
(Application filed Oct. 24, 1896.)
(No Model.)
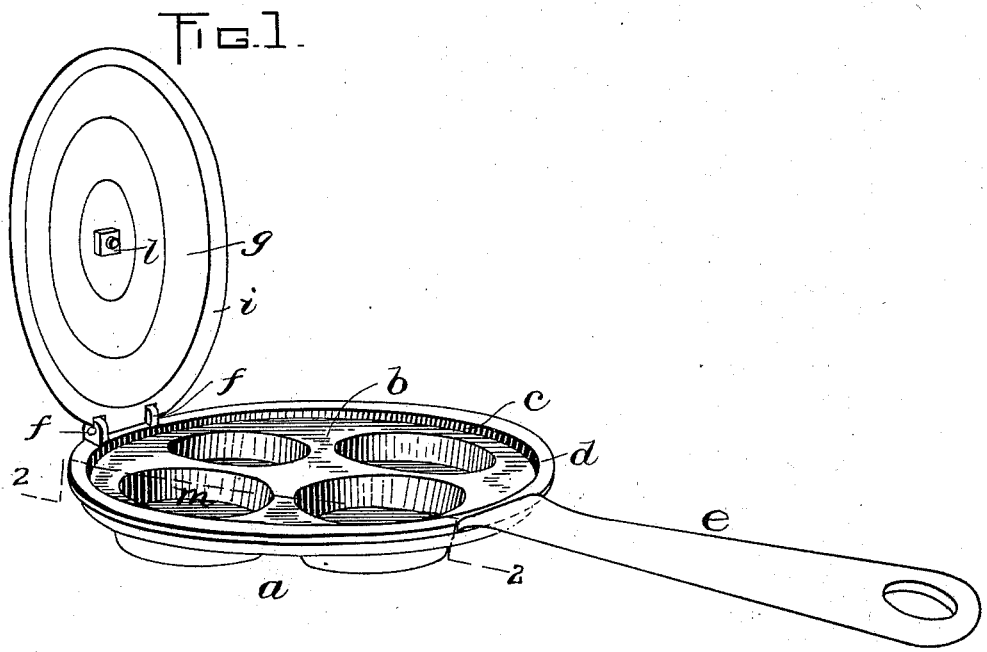
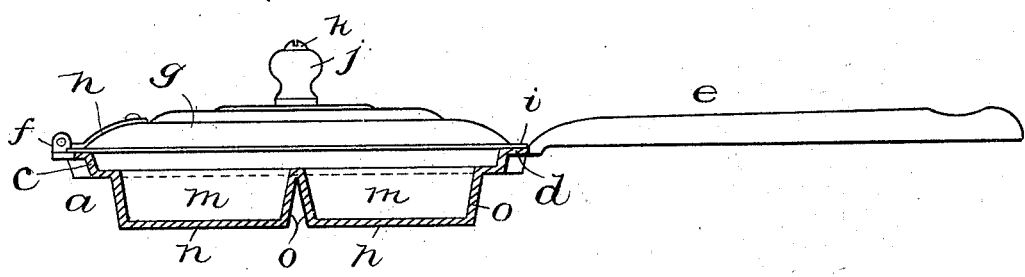
WITNESSES:
A. D. Hanson
P. W. Pezzetti.
INVENTOR:
Daniel R. Porter

UNITED STATES PATENT OFFICE.

DANIEL R. PORTER, OF CHELSEA, MASSACHUSETTS.

EGG-BROILER.

SPECIFICATION forming part of Letters Patent No. 608,144, dated July 26, 1898.

Application filed October 24, 1896. Serial No. 609,963. (No model.)

*To all whom it may concern:*

Be it known that I, DANIEL R. PORTER, of Chelsea, in the county of Suffolk and State of Massachusetts, have invented certain new and useful Improvements in Egg-Broilers, of which the following is a specification.

This invention has for its object to provide a cooking utensil adapted to fry eggs in a satisfactory manner without the necessity of turning the eggs during the frying operation.

The invention consists in the improved utensil which I will now proceed to describe and claim.

Of the accompanying drawings, forming a part of this specification, Figure 1 represents a perspective view of an egg-cooking utensil embodying my invention. Fig. 2 represents a section on line 2 2 of Fig. 1.

The same letters of reference indicate the same parts in both figures.

In carrying out my invention I provide a shallow pan formed to enter a hole in a stove-top and composed of a flat bottom $b$ and a circular rim $c$, surrounding said bottom. On the rim $c$ is formed an outwardly-projecting flange $d$, adapted to bear upon a stove-top around a hole therein, the rim $c$ being formed to enter said hole. In the bottom $b$ are formed a series of depressions or pockets $m\ m$, each forming a small frying-pan of sufficient size to receive an egg separated from its shell. The depressions $m$ project below the bottom $b$.

$g$ represents a cover, which is pivoted to ears or lugs $f\ f$, formed on the flange $d$. The cover is provided with a marginal lip or seat $i$, formed to bear closely upon the flat upper surface of the flange $d$, and thus prevent the escape of liquid fat from the interior of the shallow pan. A reinforcing-piece $h$ is preferably affixed to the cover $g$ at the point where it is hinged to the lugs $f$.

In using the described device the shallow pan is inserted in a stove-hole, the rim $c$ entering the hole and being suspended therein by the bearing of the flange $d$ upon the stove-top surrounding the hole. The entire bottom of the pan and the portions of its rim $c$ are thus subjected to direct heat from the fuel in the fire-box. Consequently the pan is thoroughly heated. The depressions $m\ m$, projecting below the pan, are also thoroughly heated. The fat used in the frying operation is melted in the depressions $m$ prior to the introduction of the eggs, and when the eggs enter the pockets the fat is displaced and flows onto the heated bottom $b$ and acts upon the top surfaces of the eggs. The cover $g$ prevents spattering of the fat from the bottom $b$, and thus contributes materially to the desirableness of the utensil.

In view of the fact that, as above stated, when the device is in use the greater portion of the fat is above the level of the bottom $b$ of the pan the cover $g$ becomes an essential feature of the construction in order to prevent any spattering of the fat which lies on the said bottom between the pockets $m$.

The construction whereby the bottom $b$ of the shallow pan is enabled to project well below the stove-top is important, since it enables said bottom to be as thoroughly heated as the walls of the depressions $m$, and thus impart sufficient heat to the liquid fat to thoroughly cook the top surfaces of the eggs, thus avoiding the necessity of turning the eggs during the operation of cooking.

I claim—

An egg-cooking utensil comprising a shallow pan formed to enter a stove-hole, and comprising a flat bottom $b$ having a series of depressions $m$, a circular rim $c$ rising from the edge of the bottom and of less diameter than the stove-hole and formed to receive the overflow of fat from said depressions, said rim having an outwardly-projecting flange $d$ adapted to rest on the stove-top, whereby the bottom of the pan and the rim $c$ are supported below said stove-top, and a cover formed to bear on the flange $d$ to prevent the spattering of liquid fat from the flat bottom $b$, substantially as and for the purposes set forth.

In testimony whereof I have signed my name to this specification, in the presence of two subscribing witnesses, this 16th day of October, A. D. 1896.

DANIEL R. PORTER.

Witnesses:
A. D. HARRISON,
C. F. BROWN.